United States Patent Office 2,869,489
Patented Jan. 20, 1959

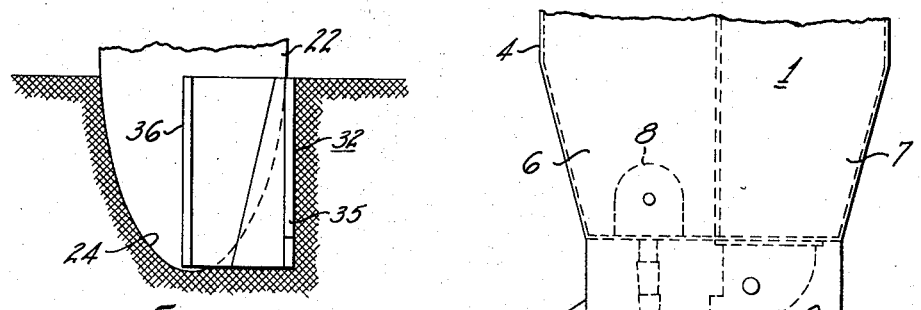
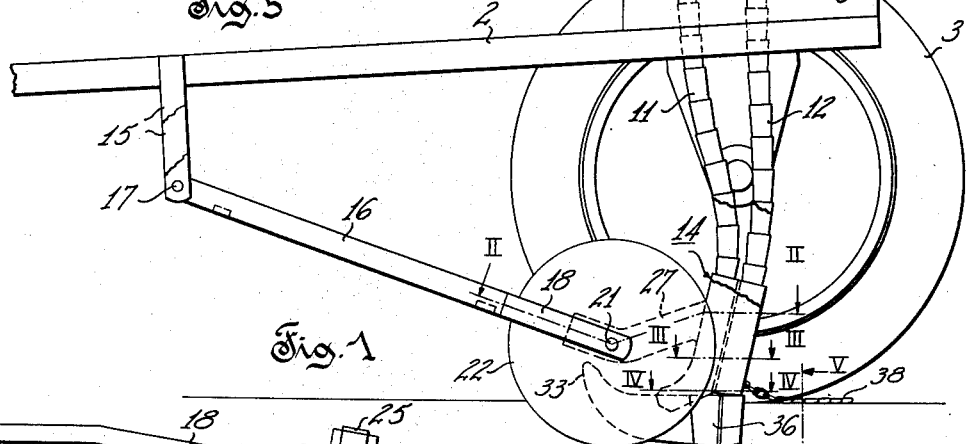
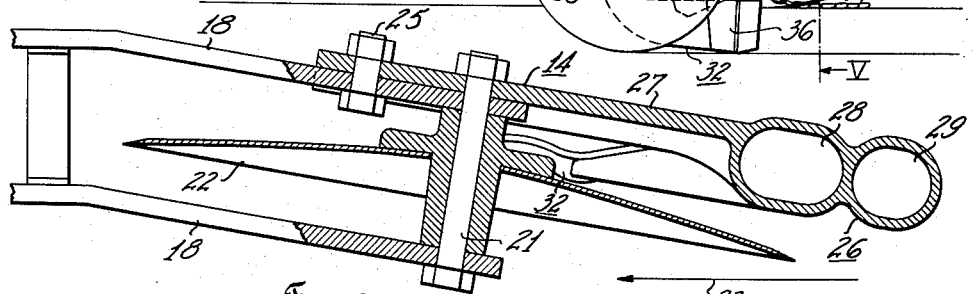
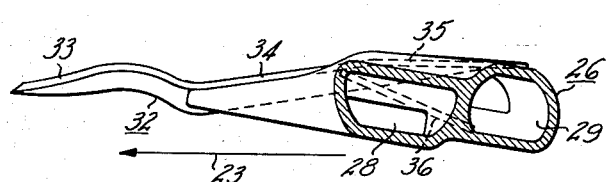
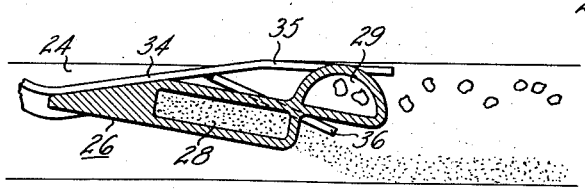

2,869,489

GRAIN DRILL DUAL FEED BOOT STRUCTURE WITH SEPARATING DEVICE

August G. Buhr, La Crosse, Wis., assignor to Allis-Chalmers Manufacturing Company, Milwaukee, Wis.

Application July 6, 1953, Serial No. 366,240

3 Claims. (Cl. 111—80)

This invention relates to planting and more particularly to a seed and fertilizer distributing arrangement including a boot and a furrow opener which supplies fertilizer simultaneously with the planting operation.

It is desirable in combined planting and fertilizer distributing operations to keep the seed and fertilizer separated since direct application of fertilizer to seed prevents the normal germination thereof. It is also desirable to mix the fertilizer with soil to avoid root damaging concentrations of fertilizer and to facilitate its absorption by the soil.

In the past the practice has been to make separate furrows so that fertilizer may be deposited in one furrow and seed in another. This, however, required two furrow openers for each seed and fertilizer distributing unit which is disadvantageous since the necessary added equipment increases both the propelling power requirements and maintenance particularly noticeable in grain drills simultaneously utilizing a large number of dual seed and fertilizer units. Further, provision of separate furrow openers necessarily increase the initial cost.

An attempted elimination of the aforementioned disadvantages has been to provide a single relatively deep furrow wherein the seed and fertilizer are deposited one above the other. This attempted solution of the problem has not proved satisfactory since forming a deep furrow also increases the propelling power requirements. In addition, the fertilizer is not mixed with the soil and whether deposited above or below the seed may result in concentrations damaging to plant growth.

Accordingly, it is desirable to provide means for forming a single furrow and simultaneously depositing seed and fertilizer therein in a manner effectively eliminating the aforementioned disadvantages.

With the foregoing in mind, it is an object of this invention to provide a seed and fertilizer distributing arrangement wherein parts are effectively combined for simultaneously depositing fertilizer and seed in a single relatively shallow furrow in proximate separated relation to each other.

Another object of the present invention is to provide a seed and fertilizer distributing arrangement embodying a novel coaction of parts for simultaneously depositing fertilizer and seed in a single relatively shallow furrow in close separated proximity and for effectively mixing the fertilizer with soil.

A further object of this invention is to provide a seed and fertilizer distributing arrangement operative to simultaneously deposit seed and fertilizer in the aforementioned improved manner and which achieves this result with a furrow forming device requiring less propelling force than that heretofore necessary with the previously known units.

A still further object of this invention is to provide a seed and fertilizer distributing arrangement which will be simple and compact in construction and efficient in operation.

These and other objects and advantages will be apparent from the following description of a preferred embodiment of the invention and from the accompanying drawings, in which:

Fig. 1 is a side view of a grain drill with the near side wheel and its supporting bracket removed and with parts broken away in the interest of simplicity;

Fig. 2 is an enlarged sectional view of the furrow opener and boot arrangement taken on line II—II in Fig. 1;

Fig. 3 is a sectional view of the boot taken on line III—III in Fig. 1 but on a larger scale with the furrow opener removed;

Fig. 4 is a sectional view of the boot taken on line IV—IV in Fig. 1 but on a larger scale and shows the position of the boot relative to the furrow; and Fig. 5 is a rear elevation, partly in section, of the furrow forming and mixing structure as seen generally from line V—V of Fig. 1 but on a larger scale.

Referring to Fig. 1, a conventional grain drill 1 has a main frame 2 supported on ground wheels 3, only one of which is shown. The main frame 2 supports a hopper 4 having a fertilizer compartment 6 and a seed compartment 7. A fertilizer distributing or feeding device 8 is associated with the compartment 6 and a seed dispensing or feeding device 9 is associated with the seed compartment 7. The devices 8 and 9 feed fertilizer and seed to tubes 11 and 12, respectively, which convey the fertilizer and seed toward the ground.

A furrow opener and boot structure 14 is connected to the grain drill 1 to form a furrow and to receive fertilizer and seed from the hopper 4 and to deposit it separately in a single furrow. It should be understood that although only one structure 14 is shown in Fig. 1, a plurality of such structures are spaced transversely of the grain drill and in aligned relation to each other in the usual manner.

Each structure 14 includes a fabricated bifurcated drag bar 16 pivotally supported at its forward end for vertical swinging movement on a transverse shaft 17 fixedly mounted in laterally aligned brackets 15 depending from the main frame 2. As shown in Fig. 2, the rear portion 18 of the drag bar 16 is laterally offset in oblique relation to the direction of travel and fixedly mounts a transverse axle 21 rotatably supporting a conventional disk type furrow opener 22. The side of the structure 14 and its elements that are nearer the line of draft is herein referred to as the inner or near side, which in Figs. 2, 3 and 4 is the side at the upper portion of the figures. Consequently, the disk 22 is positioned at an angle to the direction of travel indicated by the arrow 23, and as the grain drill 1 moves forward during the planting operation, the angularly positioned disk 22 opens a narrow furrow 24.

A boot structure 26 is positioned adjacent to the disk furrow opener 22 and rearwardly of the axle 21 by means of a bracket 27 integral with and extending forwardly from the boot structure. Bracket 27 is rigidly secured in side abutting relation to the inner side of drag bar 16 by means of the inner end of axle 21 and bolt 25. The boot structure 26 is provided with a pair of separate vertically extending front and rear passages 28 and 29, respectively. The front passage 28 receives the lower end of the fertilizer tube 11 and the rear passage 29 receives the lower end of the seed tube 12.

It should now be apparent that the feed device 8 operates to dispense fertilizer from the hopper compartment 6 through the tube 11 and into the forward boot passage 28. Also the feed device 9 operates to dispense seed from the compartment 7 through the tube 12 and into the rear boot passage 29. Both passages 28 and 29 terminate in lower discharge portions arranged in tandem and disposed in direct material depositing relation to a narrow furrow so that upon advance of the planter, the trailing discharge aperture will traverse an area of the furrow contiguous to the furrow area traversed by the leading discharge aperture. The narrow furrow is cut by the disk 22 and somewhat widened by the coaction of the forwardly projecting runner blade 32 which is rigidly secured to a lower portion of the boot 26 in any conventional manner such as welding or riveting.

A forward end portion 33 of the blade 32 is shaped to extend forwardly and upwardly in approximate conformity to the curvature of the disk 22 and to thereby serve as a scraper to remove soil which may accumulate on the disk. The portion 34 of the runner immediately to the rear of the forward portion 33 extends inward in oblique widening relation to the furrow formed by the soil engaging portion of the disk opener 22, this oblique portion merging with a straight fore and aft portion 35 engaging the inner side of the boot 26. The portions 34 and 35 of the blade are formed to extend somewhat below the boot 26 on the inner or right side thereof as best shown in Fig. 5. Referring also to Fig. 4, a short rigid deflecting blade or scraper 36 projects laterally outward from the portion 34 of blade 32 in oblique rearward extending relation thereto and between the terminal discharge ends of the passages 28 and 29.

It can now be seen that as the furrow opener 22 and the boot structure 26 move forwardly as a unit, fertilizer is deposited in the furrow immediately in advance of the blade 36, the latter being positioned to move some soil together with the deposited fertilizer to the outer side portion of the furrow as indicated in Fig. 4. The oblique relation of the blade 36 coupled with the general V-shape of the furrow in cross section effects a tumbling or rolling action of the soil and fertilizer, thus effecting a thorough mixing thereof as it moves toward the outer side of the furrow and out of contact with the blade 36. The end of blade 36 terminates laterally outward relative to the discharge end of seed passage 29. Consequently seed deposited through the rear passage 29 is disposed laterally inward of the furrow relative to the mixture of fertilizer and soil disposed adjacent the outer side wall of the furrow by the coaction of front passage 28 and the blade 36. The relative positions of the mixture of soil and fertilizer and of the deposited seed is clearly indicated in Fig. 4. The boot 26 is provided with a suitable device, such as the trailing chain 38, which effectively covers the deposited material as the boot moves forward.

As previously indicated, the coaction of the furrow opener, the separate seed and fertilizer depositing means, and the obliquely disposed scraper element is such that the fertilizer is effectively mixed with soil and that the mixture and seed remain separate in laterally opposite portions of the furrow. Further, it should be apparent that this result is achieved irrespective of furrow depth and width. Consequently, it is entirely unnecessary to provide either a deep or wide furrow and that therefore, the propelling power requirements are a minimum. In addition, it should be apparent that the aforementioned coaction inherently eliminates concentrations of fertilizer and the resulting damage to seed germination and plant growth. Moreover, all this is obtained with a simplified and inexpensive construction which is also an important advance in the art.

In accordance with the broad aspects of the invention, structure is provided to discharge seed and fertilizer in a narrow furrow and to obtain a coaction of parts effectively mixing the fertilizer and soil and separating the mixture from the seed as previously disclosed. Therefore, while it has been found that best results are obtained with the preferred embodiment of the invention herein shown and described for purposes of illustration, it should be understood that it is not intended to limit the invention to the particular form and details described herein as various other forms and modifications embraced by the scope of the appended claims may occur to persons skilled in the art.

It is claimed and desired to secure by Letters Patent:

1. In a mobile seed planter having a soil working tool for opening a furrow and a mechanism for depositing seed and fertilizer materials along opposite sides, respectively, of said furrow; said tool comprising a disk positioned for rotation on a horizontal axis disposed in oblique relation to the direction of travel to form a single, generally V-shaped furrow, and a runner element extending rearwardly and laterally from the central portion of said furrow so as to widen the bottom part of the latter; and said seed and fertilizer depositing mechanism comprising a boot structure disposed rearwardly of said disk axis and having a pair of downwardly extending passages for conveying seed and fertilizer, respectively, one of said passages terminating in proximity to one side of said widened furrow adjacent said runner element and the other of said passages terminating forwardly of said one passage to deposit one of the seed and fertilizer materials into the furrow in front of and substantially in line with a deposit of the other of said materials in said furrow, and means mounted on said material conveying structure between the terminal portions of said passages in diagonal relation with said furrow, said means extending downward to the bottom of said furrow and presenting a surface portion engageable with the material deposited by said other passage so as to deflect said last mentioned material toward the other side of said furrow.

2. A mobile seed planter as set forth in claim 1 wherein said deflecting means comprise a vertical blade element connected to said runner member and extending laterally and rearwardly therefrom between said passages and partially across the width of said furrow.

3. In a mobile seed planter, the combination of a soil working tool for opening a furrow, a boot structure having a leading fertilizer material conveying passage and a trailing seed conveying passage extending separately from each other downwardly therethrough and presenting relatively spaced discharge apertures, respectively, at the lower end of said boot structure; means mounting said tool and boot structure in such relation to each other as to position said lower end of said boot structure within said furrow; said discharge apertures being arranged in tandem so that, upon advance movement of said planter, the trailing one of said apertures will traverse an area of said furrow contiguous to the furrow area traversed by the leading one of said apertures; and deflector means carried by said boot structure in diagonal relation to said furrow and extending into said furrow rearwardly of said leading aperture and forwardly of said trailing aperture, said deflector means extending to the bottom of said furrow and presenting a surface portion engageable with material discharged from said leading aperture so as to sweep it from said furrow area traversed by said leading aperture into laterally spaced relation to said furrow area traversed by said trailing aperture.

References Cited in the file of this patent

UNITED STATES PATENTS

| 1,012,118 | Aspinwell | Dec. 19, 1911 |
| 1,286,430 | Shirai | Dec. 3, 1918 |
| 2,001,003 | Tuft | May 14, 1935 |
| 2,351,173 | White | June 13, 1944 |
| 2,364,958 | Drennan | Dec. 12, 1944 |
| 2,611,331 | O'Neil | Sept. 23, 1952 |
| 2,769,412 | Holle | Nov. 6, 1956 |

FOREIGN PATENTS

| 119,027 | Australia | Oct. 3, 1944 |
| 9,933 | Great Britain | A. D. 1900 |